Figure 1:
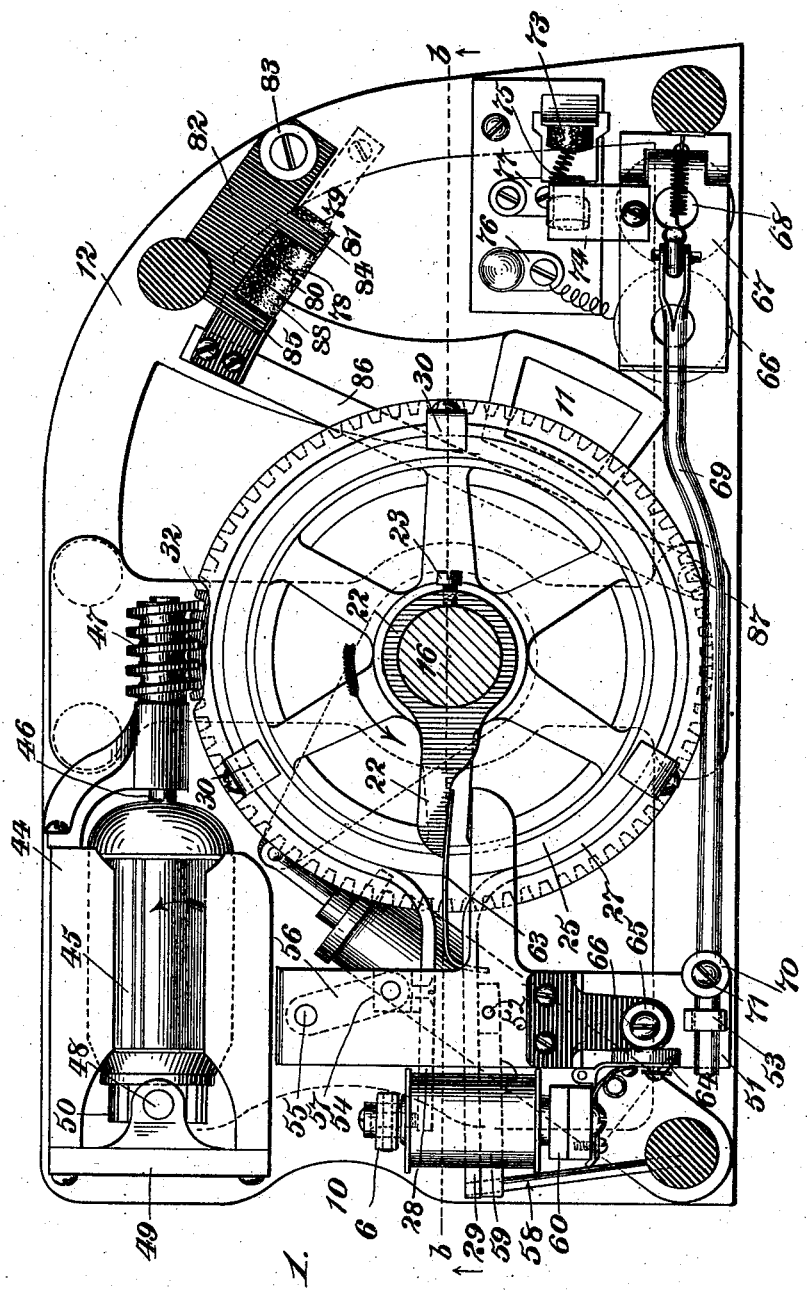

No. 694,370. Patented Mar. 4, 1902.
E. R. GILL.
AUTOMATIC ACTUATOR FOR POWER REGULATORS.
(Application filed Mar. 14, 1899.)

(No Model.) 9 Sheets—Sheet 1.

Witnesses
Edward Howland
Oscar O. Seiffert

Edwin R. Gill Inventor
By his Attorney H. H. Mackay

No. 694,370. Patented Mar. 4, 1902.
E. R. GILL.
AUTOMATIC ACTUATOR FOR POWER REGULATORS.
(Application filed Mar. 14, 1899.)
(No Model.) 9 Sheets—Sheet 3.

No. 694,370. Patented Mar. 4, 1902.
E. R. GILL.
AUTOMATIC ACTUATOR FOR POWER REGULATORS.
(Application filed Mar. 14, 1899.)
(No Model.) 9 Sheets—Sheet 4.

No. 694,370. Patented Mar. 4, 1902.
E. R. GILL.
AUTOMATIC ACTUATOR FOR POWER REGULATORS.
(Application filed Mar. 14, 1899.)
(No Model.) 9 Sheets—Sheet 5.
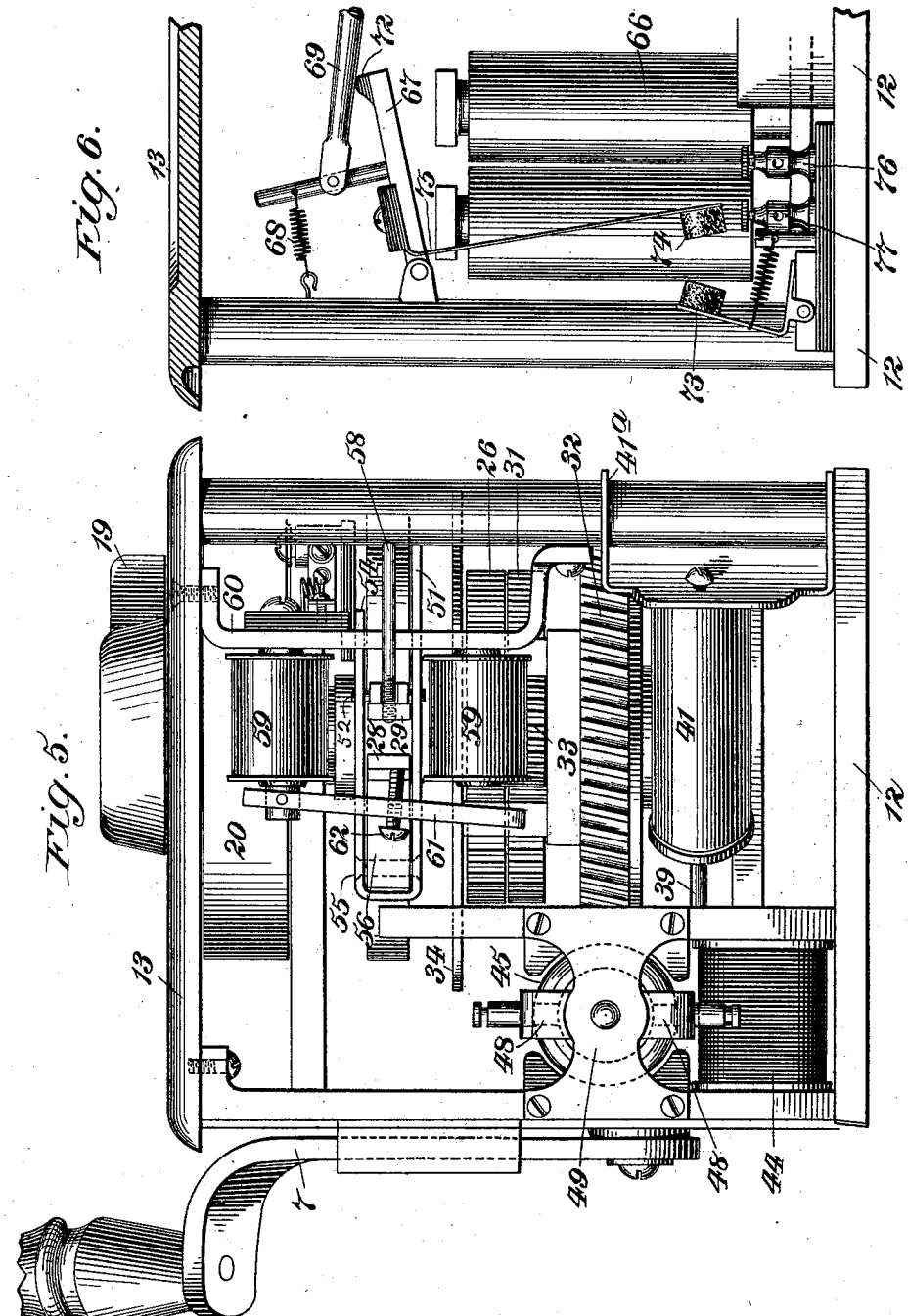

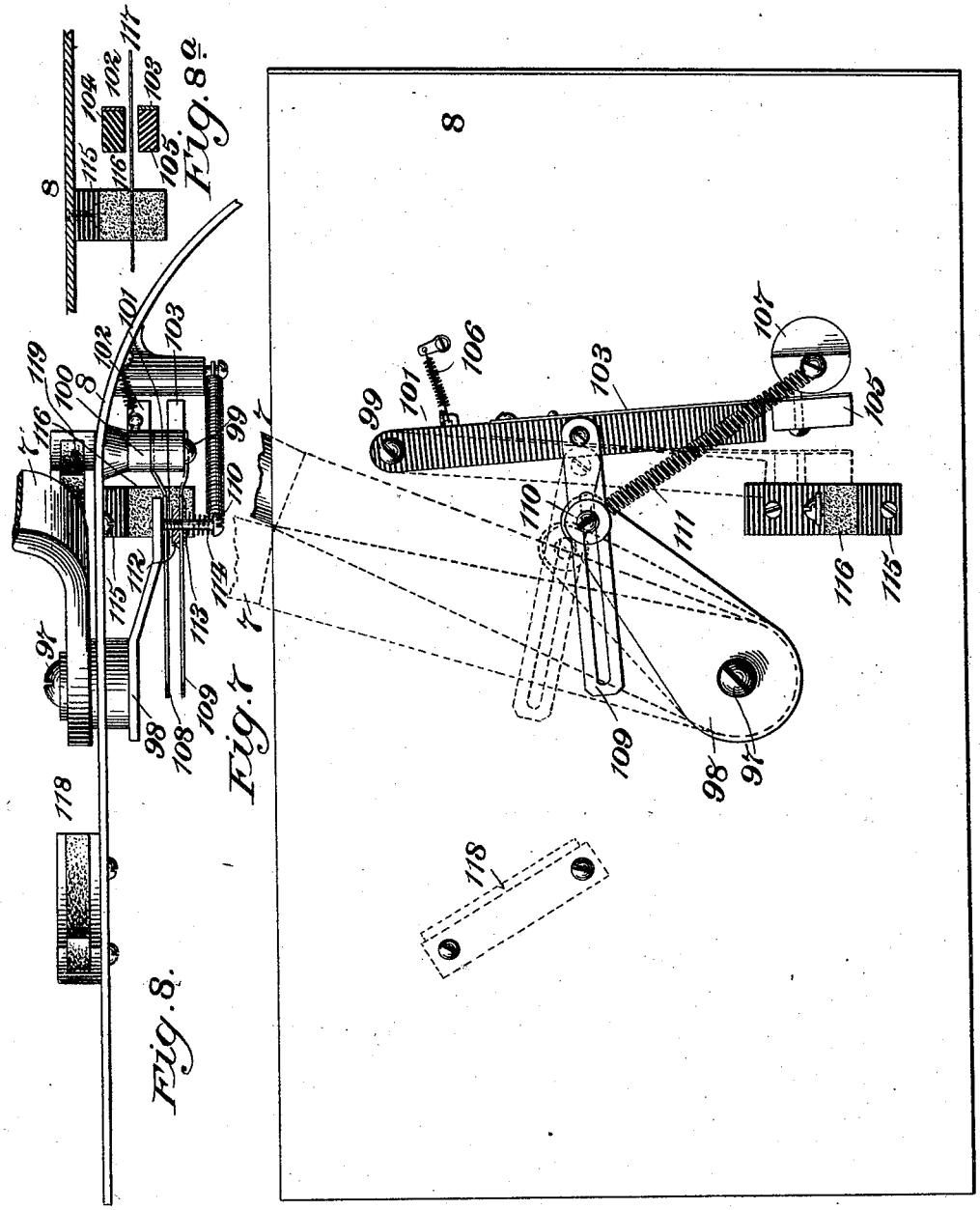

No. 694,370. Patented Mar. 4, 1902.
E. R. GILL.
AUTOMATIC ACTUATOR FOR POWER REGULATORS.
(Application filed Mar. 14, 1899.)
(No Model.) 9 Sheets—Sheet 7.
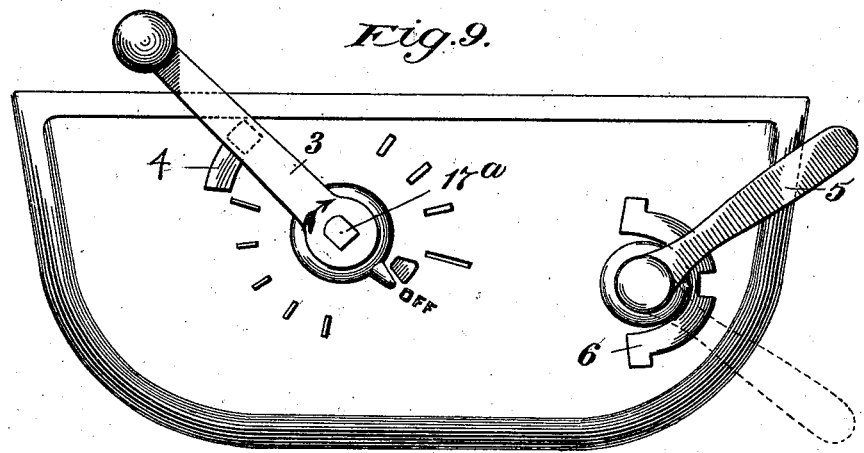
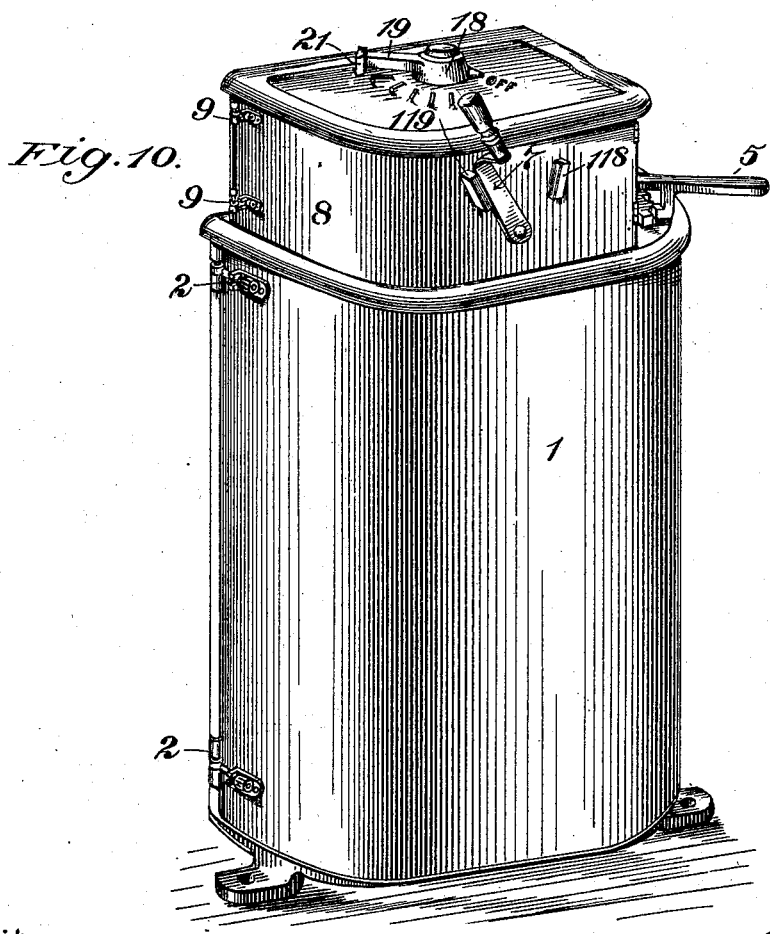
Witnesses
Edward Rowland
Oscar O. Seyfert
Inventor
Edwin R. Gill
By his Attorney
H. Hallett Tapp
THE NORRIS PETERS CO., PHOTO-LITHO., WASHINGTON, D. C.

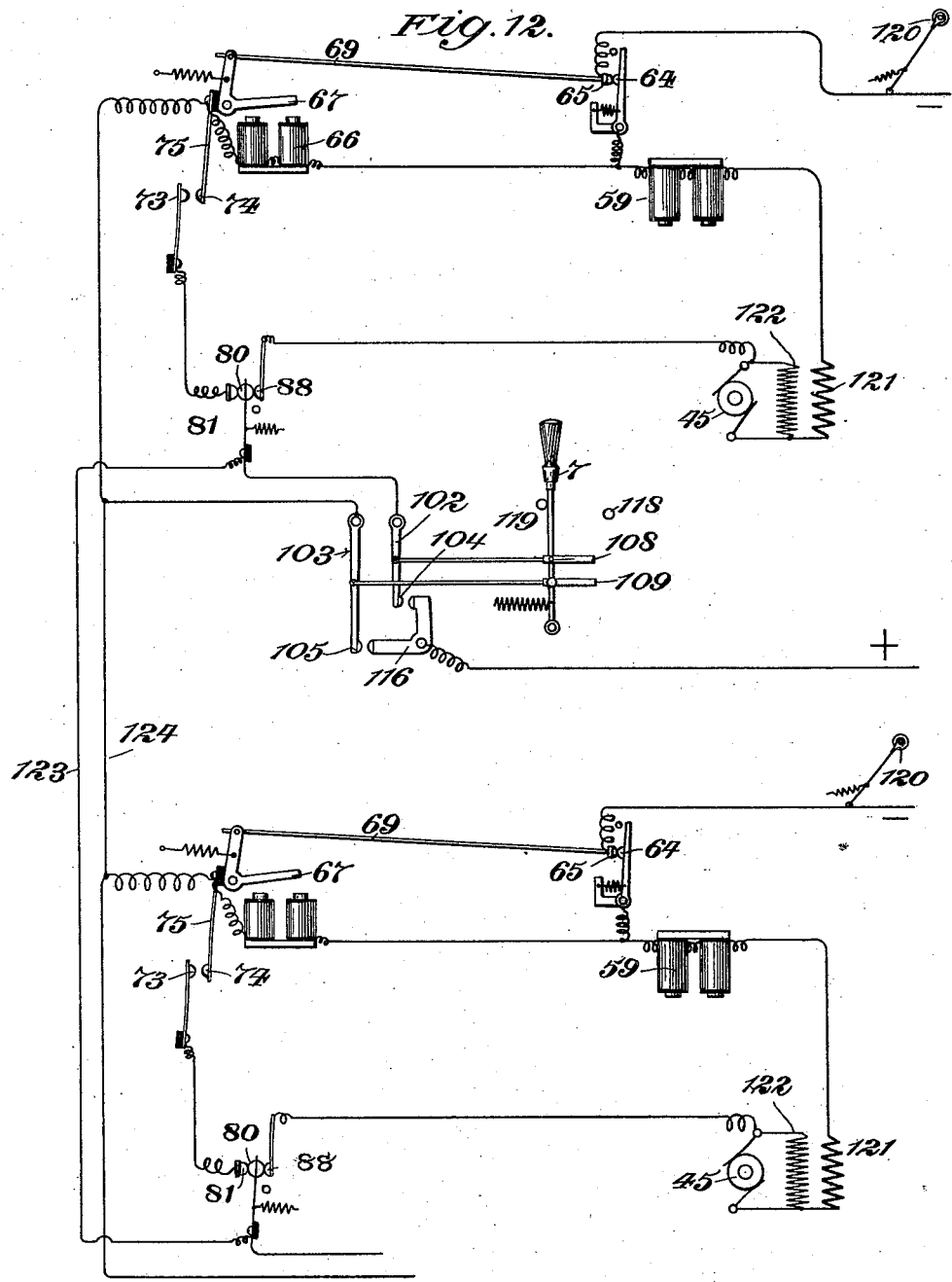

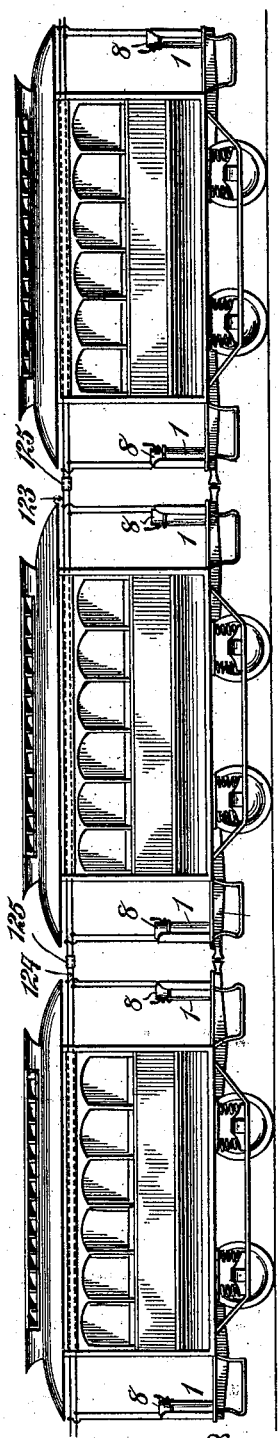

UNITED STATES PATENT OFFICE.

EDWIN R. GILL, OF NEW YORK, N. Y., ASSIGNOR TO INVENTION DEVELOPING COMPANY, A CORPORATION OF NEW JERSEY.

AUTOMATIC ACTUATOR FOR POWER-REGULATORS.

SPECIFICATION forming part of Letters Patent No. 694,370, dated March 4, 1902.

Application filed March 14, 1899. Serial No. 709,015. (No model.)

*To all whom it may concern:*

Be it known that I, EDWIN R. GILL, a citizen of the United States, residing in the city, county, and State of New York, have invented a certain new and useful Improvement in Automatic Actuators for Power-Regulators, of which the following is a specification.

My invention relates to improvements in mechanism for the operation of power-regulators of all kinds, whether for steam, hydraulic, electric, or other engines, but is particularly useful in connection with electric controllers and lends itself with especial advantage to coöperation with standard forms of controllers now in the market. It is therefore to be understood that while in the following specification and in the drawings accompanying the same I have shown the application of my invention to electric controllers claims not otherwise limited are intended to apply to use of my invention with any form of power-regulator.

One of the objects of my present invention is to provide such a construction of controller-actuator as will leave as little as possible to the discretion, intelligence and attention of the person in charge of the controller. I therefore prefer to so arrange my mechanism as to make it impossible to leave the controller itself in positions involving insertion of dead resistance in circuit, while at the same time permitting use of my mechanism with forms of controller which provide temporary connections with such dead resistances to prevent undue arcing and other difficulties.

Another feature of my invention is the provision of a controller-actuator which shall insure return of the controller whenever there is failure of current in the operating-circuit from any cause—as, for instance, through accident or design at the power-house or from the jumping of the trolley from the wire. At the same time I make the return to "normal," by which I mean the position corresponding to stoppage of the main motor controlled, as instantaneous as possible, while protecting the structure of the main controller from injury due to shock. I also provide means whereby the return to normal is accomplished without vibration or rebound, and thus avoid tendency to destructive arcs within the main controller at the separating contact-points.

Another feature of my invention is to render the return to normal absolutely certain, even on momentary failure of current, by removing all operative connection between the manipulator in the motorman's hand and the actuating mechanism during the return of the controller. Thus I avoid danger of injury to the main controller by careless release thereof and sudden catching before full return.

Another feature of my invention is the provision of a form of automatic actuating mechanism whereby any desired number of controllers may be operated from a single handle or manipulator consistently with use of a separate manipulator at each controller, if desired. This is especially useful for the control simultaneously of two or more electric cars from the front platform, while permitting of breaking up and making of trains without slacking speed. I accomplish this with a minimum number of wires, and preferably provide such a construction that the full voltage of the line may be used for operating the controller-actuator without use of dead resistances, which consume energy.

Another feature of my invention, connected with that last named, is the provision of a construction whereby the magnets necessarily used for multiple work are made absolutely reliable by giving them a minimum of mechanical resistance to overcome. This I accomplish by making the returning-spring or equivalent store up force available in affording mechanical aid to the magnets and then relying upon the magnets simply to maintain the necessary mechanical position thus secured, said magnets acting always with their armatures in such a position as to insure maximum efficiency of the magnet.

While my present invention is readily adaptable to use in any desired situation and in a great variety of modified forms, it possesses certain features contributing to permit of its use in a very compact form and in connection with a very small auxiliary motor. Indeed, I have been able to carry this contraction of dimensions so far as to produce a practical, efficient, and simple form of my invention adapted to fit on the end or top of the well-known controller-boxes hitherto widely used on the platforms of electric cars. This takes the form of a self-contained apparatus, preferably inclosed, of less horizontal area than the end of the main-controller box, which can be put on and off as readily as the crank-handle hitherto employed.

I believe myself to be the first to successfully produce a self-contained apparatus capable of use in this way, whether easily removable, as aforesaid, or not, and have therefore claimed the same broadly, and have shown my invention in this form as being the one preferred. I have given this particular embodiment of my invention the name of an "automatic controller-handle."

Certain advantages readily attainable by use of my invention are particularly serviceable in connection with the aforesaid self-contained automatic handle. For instance, the preferred embodiment of my invention provides a virtual extension of the main-controller axle through the apparatus. The end of this virtual extension projects through the casing of the automatic handle and may be employed as an indicator showing the position of the controller and may be adapted to be operated directly by hand in case of accident to the automatic apparatus.

Another feature of my invention which contributes to convenient restriction of parts to small compass is the provision of a form of motor which can be made of very small size and yet can be placed in a high-voltage line and controlled by a simple make-and-break switch without appreciable sparking at the commutator and without the use of dead resistance to reduce the current in said motor.

Another advantage of my invention, fitting it to use as an automatic handle, as aforesaid, lies in the fact that the tension of the spring or other agent for returning to normal can be adjusted as to its force without disturbing the mechanism within the casing, and thus permits of use of one mechanism on any one of a number of main controllers of differing mechanical resistances.

In the following specification I shall first describe the mechanical construction of my preferred form of automatic controller-handle as embodying one form of my invention and shall then describe its mode of operation in connection with the necessary electric circuits as preferably employed in railroad practice. This preferred form of one embodiment of my invention is illustrated in the accompanying drawings, wherein—

Figure 2:
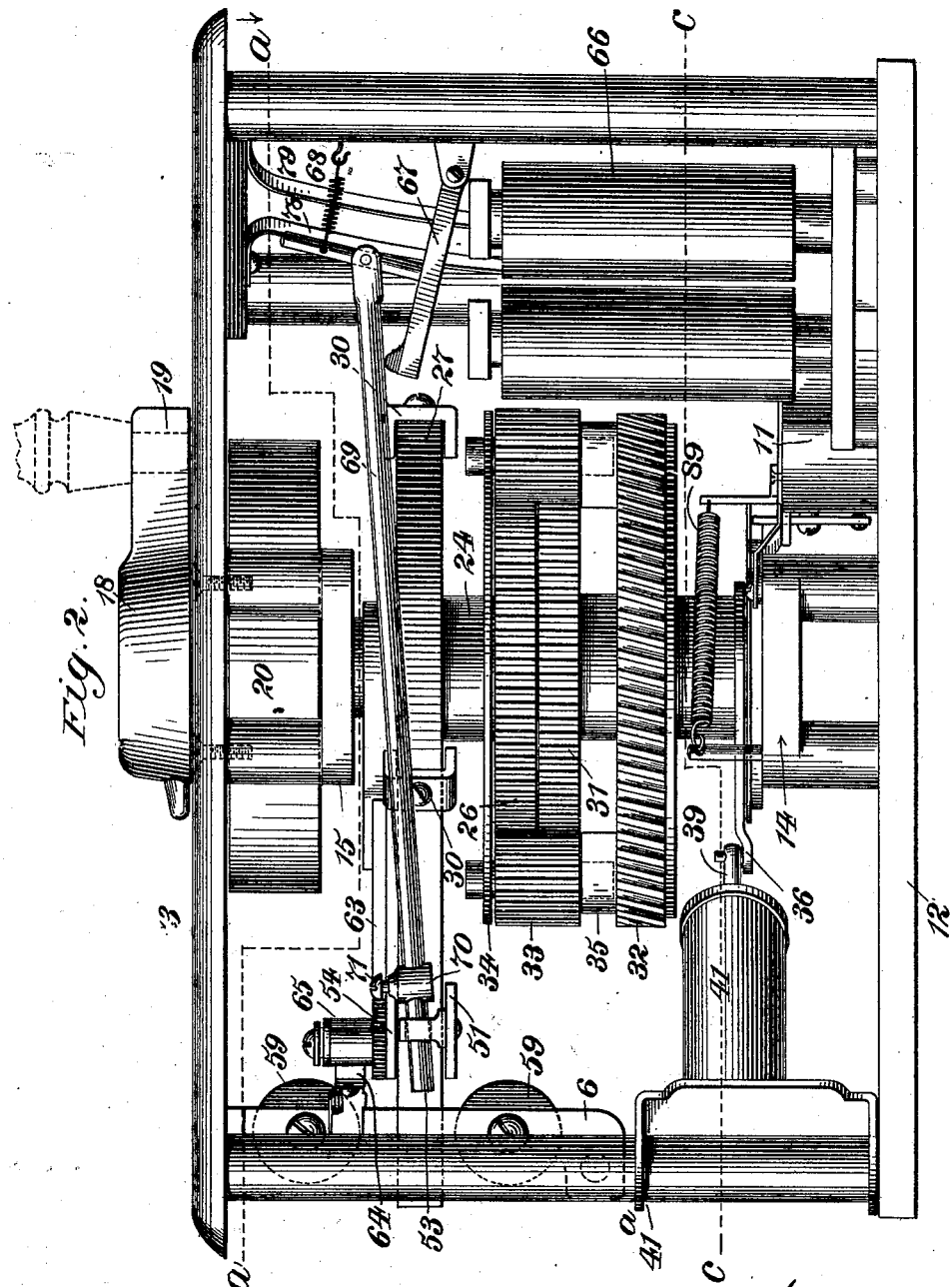
Figure 3:
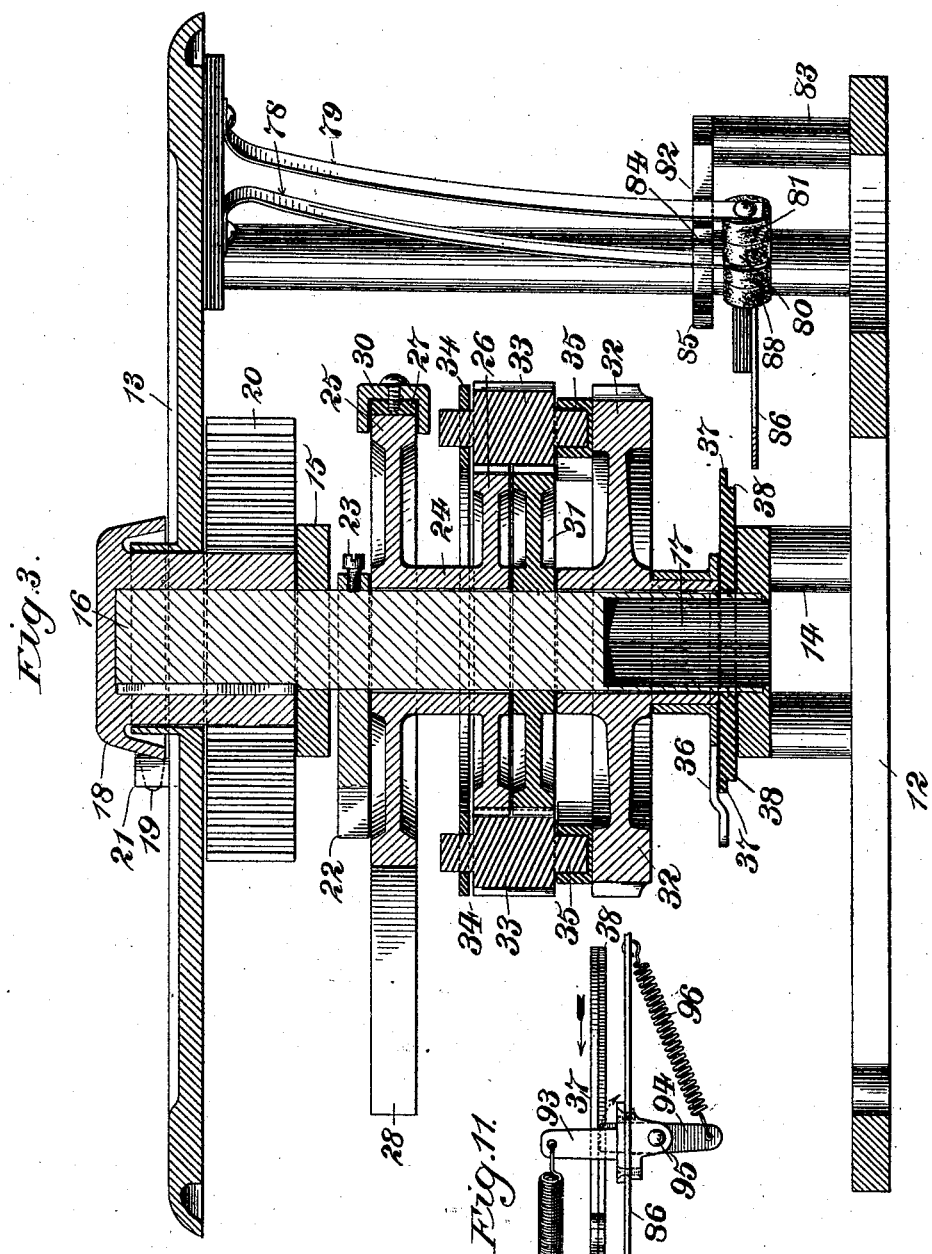
Figure 4:
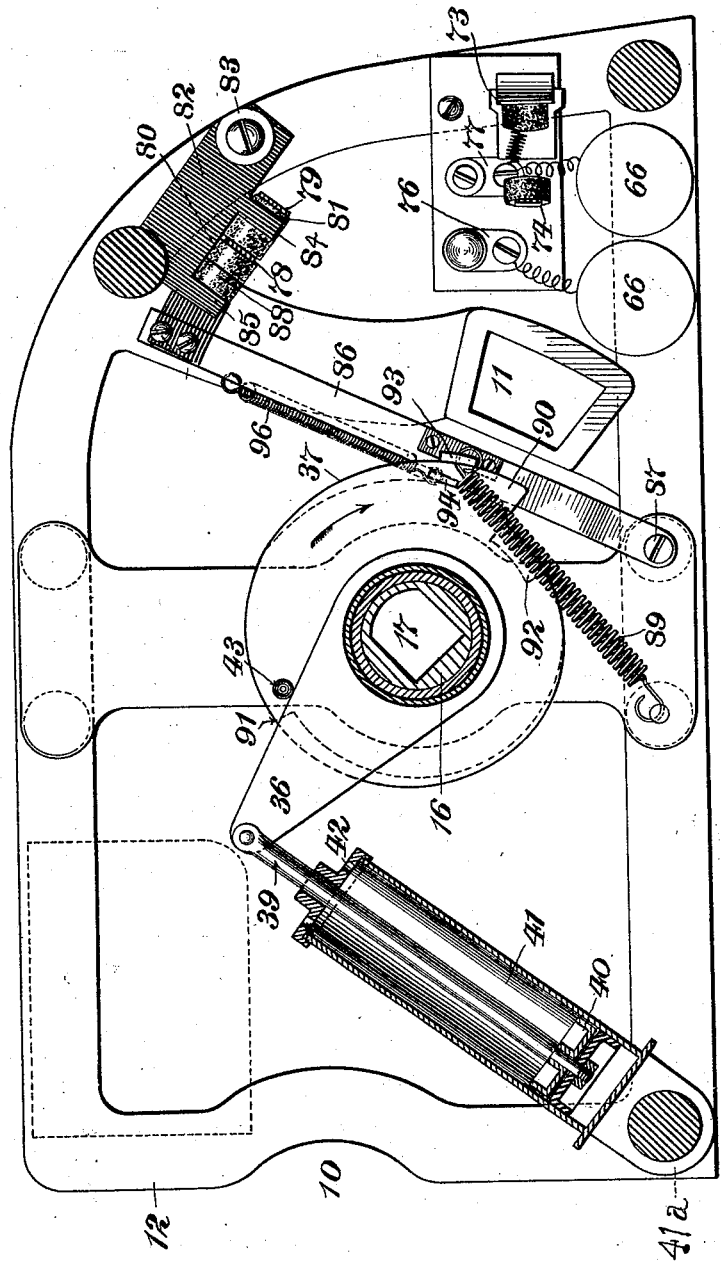

Figure 1 is a horizontal sectional view of my preferred device on the line $a\ a$ of Fig. 2 with the inclosing covers removed. Fig. 2 is a rear elevation of my preferred device with the inclosing covers removed and the driving-motor being omitted for the sake of clearness. Fig. 3 is a central vertical section of the same on the line $b\ b$ in Fig. 1, certain parts at the left of Fig. 1 being omitted. Fig. 4 is a horizontal section of the same on the line $c\ c$ of Fig. 2, illustrating the means for engaging the revoluble axis of the main controller or power-regulator. Fig. 5 is an end elevation of my preferred device with only the front and top cover left on. Fig. 6 is a front elevation of what I term the "relay retaining-magnet" and a portion of its accessories. Fig. 7 is an elevation of the inner surface of the front cover of my device, showing the manipulator in connection therewith in two positions. Figs. 8 and $8^a$ are respectively a plan view of what is shown in Fig. 7 and a sectional view of some details thereof. Fig. 9 is a plan view of a well-known form of hand-operated controllers used on the platforms of electric cars. Fig. 10 is a perspective view of the same, showing my improvement as applied thereto. Fig. 11 is an elevation of certain details of preferred circuit-controlling cams used by me, and Fig. 12 is a diagram of circuits used where one manipulator governs two or more actuating devices, and Fig. 13 is a side view of a train of three cars provided with my controller.

In Figs. 9 and 10 are shown the well-known main controller of an electric car, the same being provided with a front cover 1, hinged in front and having the securing-fastenings 2. In practice the controller has been hitherto operated by means of an ordinary crank-handle 3, provided with a stop 4 on the controller top. The handle 5 is used to reverse the main car-motors and is usually provided with a guard 6, preventing removal of said handle save when the reversing-switch is in its middle position.

In Fig. 10 is shown my preferred form of automatic controller-handle substituted for the crank 3 and provided with the manipulator-handle 7, which, with its accessory parts, may or may not be affixed to each controller-actuator in use on a train of cars.

It will be observed that in the preferred form shown my automatic handle imitates the general design of the main-controller box, having a front cover 8, provided with fastening 9 of any desired pattern.

In Figs. 1 and 4 is shown the preferred form of framework hitherto used by me, the same finding two points of abutment on the main-controller box for supporting the reaction incident to operation of the main controller. One of these abutments is at the curve 10, which accommodates the hub of the reversing-handle 5 and where the lower framing abuts against the guard 6. The other abutment is at the socket 11, which fits over the stop 4 on top of the main-controller box. Of course one of these abutments would be alone sufficient. The bottom and top frames 12 and 13 are preferably similar in general outline and each carries a cross-support 14 15. (See Fig. 2.)

As shown in Figs. 2 and 3, the transmission system, whereby movement is imparted at will to the central shaft of the main controller, is pivoted and supported between the two cross-supports 14 and 15. As shown in Fig. 3, the inner shaft 16 is provided with a socket 17 at its lower end adapted to fit over the top of the main-controller shaft 17ª, of which latter the shaft 16 forms a virtual removable continuation. (See also Figs. 4 and 9.) Upon the shaft 16 and moving with it I prefer to place a cap 18, projecting through the top cover and carrying the pointer and stop-arm 19, which serves to indicate to the operator the position of his own controller as well as that of all others in operative circuit with it. (See Fig. 10.) As shown in Fig. 2 in dotted lines, a handle may be applied, if desired, to the indicator-arm or otherwise on the main driving-shaft 16, whereby in case of accident to the actuator mechanism the said shaft may be turned by hand. Fastened to the cap 18 or otherwise attached to the shaft 16 is the spiral spring 20, the opposite end of which is secured in any appropriate manner to the top frame 13, so that on turning the shaft 16 in the direction of the arrow in Fig. 4 said spring will be wound up and exert a constant tendency in the opposite direction, which left unopposed holds the pointer and stop-arm against or near the stop 21. (See Figs. 3 and 10.) It is obvious that the degree of force of the spring 20 can be regulated by the number of wind-up turns given to the shaft 16 before adjusting the stop 21 in place, and thus any given automatic handle may be adjusted to suit the mechanical resistance of any given controller or power-regulator.

In Figs. 1 and 3 is shown the tightening-lever 22, adjustably secured to the shaft 16, beneath the cross-support 15, by means of the set-screw 23. Just below the tightening-lever 22 is a sleeve 24, which I term the "brake-sleeve," adapted to turn loosely upon the shaft 16. This sleeve carries the brake-wheel 25 and the brake-gear 26, as shown in Figs. 2 and 3. Surrounding the brake-wheel 25 is the brake-strap 27, preferably of more or less resilient metal, terminating in two substantially parallel extensions 28 29, coming close together, as shown in Figs. 1 and 5. This strap is preferably held in place by means of angle-pieces 30, projecting above and below the periphery of the brake-wheel 25. Immediately beneath the brake-gear 26 is the driven gear 31, fast on shaft 16. (See Fig. 3.) Beneath this gear in turn is the driving-gear 32, turning loosely upon the shaft 16 and carrying with it, preferably at one hundred and eighty degrees from each other, the two wedging-gears 33, pivoted between the ring 34 and the bearings 35. Of course more than two wedging-gears may be used, if desired. Loosely sleeved on the shaft 16 and preferably around the hub of the driving-gear 32 is the retarding-arm 36. (See Figs. 3 and 4.) Beneath the arm 36 and the hub of 32 is the double cam 37 38, fast on the shaft 16. (See Figs. 3, 4, and 11.)

It will be seen that in my preferred embodiment the transmitting system and a portion of the retarding and circuit-controlling systems are centered upon the main motive shaft. This arrangement promotes the compactness desirable in the removable automatic handle described and illustrated herein; but my invention is not limited solely to this arrangement.

As shown in Fig. 4, the retarding-arm 36 coöperates with a piston-rod and piston 39 40, which latter moves air-tight within a pivoted dash-pot 41, pivoted as at 41ª, provided with appropriate openings at 42 and closed at the opposite end. When the shaft 16 and cams 37 and 38 move in the direction of the arrow in Fig. 4, friction carries the arm 36 and piston 40 with said cams until the piston is at the outer end of its stroke. On the return, however, when, as hereinafter described, the shaft is turning backward under the unimpeded tendency of the spring 20, the abutment 43 on the top of cam 37 comes in contact with the retarding-arm 36, as see Fig. 4, and the dash-pot acts to cushion the return of the main controller to normal.

As shown in Figs. 1 and 5, a small motor having a field-magnet 44 and armature 45 is fastened in one corner of my device, the armature being provided with means, as the shaft and worm 46 47, to turn the driving-gear 32. The arrow on the motor in Fig. 1 shows the direction of operative movement of the motor with the worm and gear 47 32. As there shown, I prefer to place the commutator-brushes 48 upon a cross-piece 49 over extensions of the field-magnet pole-pieces 44 and to let them bear upon a commutator 50 within said cross-piece.

The broad principle whereby my auxiliary motor 44 45 is made to drive the shaft 16 and with it the main controller depends upon the use of two gears, one fixed to the mechanism to be driven, the other provided with means whereby its state of rest or motion may be controlled at will, together with means causing relative movement of said gears. In the preferred embodiment of my invention this broad principle takes the form illustrated. Here two crown-gears are shown at 26 and 31 and they are provided with unequal numbers of teeth, although having preferably equal diameters. According to the relative speed desired a difference of one, two, or even of more teeth may exist between these two gears. It is obvious that these gears are not necessarily of equal diameters and that by suitably forming the wedging-gears 33 one of the gear-wheels 26 31 may be made larger than the other. When the motor turns the worm 47, the driving-gear 32 causes wedging-gears 33 to revolve around the gears 26 31, and as said wedging-gears mesh with both 26 and 31 it is evident that the necessity of preserving this mechanical engagement causes relative movement between the gears 26 and 31, since the teeth of gears 33 act to wedge themselves into the slightly unequal spaces between contiguous teeth in the two gears and to press them progressively into agreement of relative position. This relative movement necessitates an absolute movement of one of the two gears when the other is at rest. Consequently as long as the brake-sleeve 24 is free it is this member that will move when the motor runs or when the spring 20 is active; but if the brake-sleeve is fixed the gear 31 must turn and with it the shaft 16 and main controller.

My preferred means for fixing the brake-wheel 25, and with it the sleeve 24 and gear 26, is shown in Figs. 1, 2, and 5. The brake-lever 51 is pivoted, as at 52, to the extension 29 of the brake-strap 27. The lever 51 carries a collar 53 at its rear end (see Fig. 2) and is turned back at its front end, so as to provide a return upper section 54 substantially parallel to the lower section. Between the upper and lower sections of lever 51 is fixed a pin 55, on which is pivoted a toggle-piece 56, the other end of which is in turn pivoted to a bracket 57, fixed to the brake-strap extension 28. (See Fig. 1.)

From the above description it will be evident that when the lever 51 is turned on its pivot 52 toward the left in Figs. 1 and 2 the toggle-piece 56 will act to press together the two brake-strap extensions 28 and 29. This squeezes the brake-wheel 25 and prevents its rotation, since the extension 29 is fixed at its outer extremity, as by means of the rod 58. It is also possible to accomplish this braking action by means of a fixed magnet 59, supported on the bracket 60, fixed to the main frame, as shown in Fig. 5. The magnet 59 acts upon a pivoted armature 61, which carries an adjustable abutment-screw 62, adapted to press upon the extension 28, and thus put on the brake.

Another agency which can be made more or less efficient in fixing the brake-wheel 25 is shown in Fig. 1. This is the tightening-lever 22, fixed to the main shaft 16, and hence pressed backward in a direction opposite to the arrow in Fig. 4 by means of the returning-spring 20. The brake-lever 51 carries an abutment, preferably in the form of a spring 63, which lies in the path of movement of the tightening-lever 22 when the machine is returned to normal by means of spring 20, as aforesaid. The pressure of the mainspring 20 is thus made available in putting on the brake 27, since the lever 22, pressing on the spring 63, tends to turn the brake-lever 51, so as to squeeze together the extensions 28 29. I employ this latter device for putting on the brake, preferably, as an auxiliary to other devices and in order that the magnet or magnets used for putting on the final operative pressure need not be made too strong and use too great an amount of current. It is quite within the spirit of my present invention, however, to employ the above-described means in applying the full force necessary to bind the brake-wheel, relying upon the magnet 66 to hold the brake in place. The turning of the lever 51 by means of lever 22 is also employed by me in closing a circuit, the use of which is explained hereafter. This circuit control takes place by means of the two contacts, preferably of carbon, shown at 64 and 65, the former of which is a spring-contact pivoted on the bracket 60, while the latter is fixed to an insulating extension 66 of the upper section of lever 51. In Fig. 1 the circuit is shown closed at these contacts by means of the lever 22 and spring 63. When the brake is put on firmly, this contact is maintained; but it will be seen that if at any time the brake-lever 51 is released while lever 22 and spring 63 are out of contact the spring action of the brake-strap opens the circuit at 64 65 for a purpose hereinafter described.

The turning of lever 51 may be accomplished, if desired, solely by means of the retaining relay-magnet 66; but, as before stated, I prefer to aid this action by means of lever 22 and to rely upon magnet 66 mainly to hold the brake in position after it has once been set.

Figs. 1, 2, and 6 fully illustrate the means whereby magnet 66 acts upon the lever 51. Over said magnet is pivoted an armature held away from magnet, as by a spring 68. To said armature is pivoted a push-rod 69, the opposite end of which is adapted to act upon the lever 51 to set and hold the brake-strap 27, as above described. For this purpose I prefer to support the operative end of the push-rod in the collar 53 and to place on the push-rod an abutment 70, preferably adjustable on said rod, as by the screw 71. By moving the abutment on the rod 69 the degree of force exerted by the magnet 66 on the brake may be adjusted. It will be observed that the armature 67 and push-rod 69 together form a toggle-joint, whereby when the armature is depressed a very strong reaction against the rod may be resisted with a comparatively weak magnet 66. By aiding such a weak magnet to apply the brake by means of the lever 22, as above described, I am able to use a strong brake with small expense of current in the magnet-coils. The upward movement of the armature 67 may be limited in any well-known manner. In the form shown this is accomplished by the end of said armature impinging upon the rod 69, as at 72.

The office of the assisting-magnet 59 in aiding the setting of the brake will be explained hereinafter.

At 73 74 (see Figs. 1, 4, and 6) are two contact-pieces, preferably of carbon, employed for closing what I have termed the "relay-brake," for a purpose hereinafter described. This is accomplished by means of a magnet in any well-known way without departing from my invention; but I prefer to make the retaining-magnet 66 accomplish this function, as illustrated. The spring contact-piece 73 is pivoted, as shown, near the magnet 66, and the contact-piece 74 is carried on a resilient conducting-arm 75, carried by but insulated from the armature 67. (See Fig. 6.) The distance between the carbons 73 and 74 is preferably so calculated that contact is made between them just before the magnet 66 is called upon to exert its full pressure through the rod 69 upon the lever 51.

The terminals 76 and 77 (shown in Figs. 1 and 6) are for making electric connection with the magnet-coils 66.

In Figs. 1, 3, 4, and 11 are shown the automatic circuit-breakers and their operating devices, the electrical relations of which to the rest of my device are fully explained hereinafter.

Attached to the upper frame 13 is an insulating-support, from which depend two spring-arms 78 and 79. (Shown in elevation in Figs. 2 and 3 and indicated in section in Figs. 1 and 4.) The spring-arm 78 carries at its extremity a contact-piece 80, preferably composed, as shown, of two carbon buttons, one on each side of said arm. The arm 79 carries a contact-piece 81, so placed as to be capable of making contact with one of the buttons 80, as shown.

As best shown in Figs. 1 and 4, the spring-arms are limited in their movement by means of the insulating-piece 82, carried by a support, as 83, and having two offsets 84 and 85. The spring 78 is so set as to constantly tend to bear against the offset 85, and the spring 79 tends to constantly bear against the offset 84. Hence the tendency of these springs is to break the contact between 80 and 81. The automatic circuit-lever 86 is pivoted, as at 87, and carries at its extremity an insulated contact-piece 88, also preferably a button of carbon. The spring 89 tends constantly to carry the button 88 away from buttons 80 and 81.

The operation of the buttons 81, 80, and 88 by the automatic contact-lever 86 is governed by the double cam 37 38. For obvious reasons it is desirable that on opening circuit between contiguous buttons 81, 80, and 88 the break should be made rapidly. At the same time when contact is restored the buttons should be moved gradually in order to avoid mechanical shocks, which would quickly destroy the more or less brittle carbon. The means which I preferably employ for this purpose is best illustrated in Figs. 3, 4, and 11. The double cam 37 38 is formed in two layers or plates, which may be integral or separately fixed to the main shaft 16. In either case these two cam layers turn always with said shaft.

The principles of relative formation of the two cams 37 and 38 are shown by an illustrative example in Fig. 4, wherein the upper cam 37 is shown in full lines and the cam 38 in dotted lines. The cam layer 37 preferably presents an unbroken spiral edge approaching the center from the point 90 through three hundred and sixty degrees of arc in a direction opposed to the arrow in Fig. 4. This arrow indicates the direction of rotation of the shaft 16 during movement of my actuating mechanism corresponding to increase of main-motor speed. The edge of the cam layer 38 preferably presents two substantially circular arcs concentric with the shaft 16, one beginning at 90 and extending to the abrupt shoulder 91 and the other, of less radius, extending from 91 to the second shoulder 92. The automatic contact-lever 86 carries two wipers 93 and 94. The wiper 93 is fixed and preferably forms a point of attachment for the actuating-spring 89. It is adapted to bear upon the cam 37. The wiper 94 is pivoted to the lever 86, as at 95. (See Fig. 11.) The spring 96 tends to hold 94 in the vertical position shown. This pivoted wiper stands lower than 93 and is adapted to bear operatively only against the lower cam 38.

In the position of my mechanism shown in Figs. 4 and 11 the two wipers 93 94 are vertical and each bears upon its own cam layer. It is the essential principle of this preferred arrangement of cams that as they revolve with the shaft 16 in the direction of the arrow in Fig. 4 the spiral edge of 37 falls away from the fixed wiper 93, while the circular edge of cam 38 holds the lever 86 in the position shown by contact with the side of the wiper 94. The spring 89 is thus prevented from operation, and mutual contact is preserved between the buttons 81, 80, and 88. It will thus be seen that during movement of the shaft 16 in the direction of the arrow in Fig. 4 control of the lever 86 is accomplished solely by means of the wiper 94, since the wiper 93 is held away from cam 37. When in the course of the rotation described the shoulder 91 comes under the wiper 94, the spring 89 is permitted to impart a sudden movement to the lever 86, so as to bring the wiper 94 down on the second circular section of cam 38. This movement causes the two buttons 80 and 81 to move forward under the influence of their supporting spring-arms 78 and 79; but since movement of the arm 79 is quickly arrested by contact with the offset 84 continued movement of the button 80 causes interruption of contact between 80 and 81 and a break of circuit, as hereinafter described. Continued rotation of the shaft and cams brings the shoulder 92 under the wiper 94 and causes the button 88 on the lever 86 to be withdrawn from contact with the button 80, which latter is held from following by the insulating-offset 85. The depth of the shoulder 92 on cam 38 should preferably be such as to permit the wiper 93 to bear once more on cam 37. Thus when the shaft 16 and cams 37 38 are rapidly returned by the spring 20 the pivoted wiper 94 is tilted against the action of its spring 96, and its top extremity makes contact with the under surface of the cam 38, leaving the wiper 93 to coöperate with the smooth cam 37 in returning the lever 86 to the position illustrated. Thus the buttons 80, 81, and 88 are restored to closed circuit without any injurious shock. When the position illustrated in Fig. 4 is regained, the spring 96 restores the wiper 94 to vertical position, and it is then again ready to operate as before.

Thus far I have described the mechanical features of my preferred actuating mechanism for power-regulators. Before proceeding to describe its electrical relations I shall describe the mechanical construction of one form of manipulator appropriate to the control of my actuating mechanism.

As shown in Figs. 5 and 10, I prefer to employ a manipulating-lever 7 outside and in front of the casing of my controller-actuator, whereby the latter may be governed.

Figs. 7, 8, and 8ª illustrate a construction which I have found useful in practice for accomplishing the above-stated ends. In Fig. 7 two positions of this mechanism are shown as seen from the interior of the casing looking forward. Fig. 8 shows a top view of the same in one position. The handle 7 is pivoted, as at 97, and carries with it an arm 98 within the casing-cover 8. A spindle 99 within the cover 8 supports two pivoted insulating-arms 100 and 101, each carrying a conducting-spring 102 103. These conducting-springs are respectively provided at their extremities with contact-pieces 104 105, preferably of carbon. The spring 106 is attached to the insulating-arm 100 and to the cover 8 and tends to hold said arm back against the insulating-stop 107. Each insulating-arm has pivoted to it an appropriate slotted link 108 109, and a pin 110 on the end of the arm 98 passes through the slots of these two links. The strong spring 111, preferably fastened to the pin 110 and the stop 107, acts to normally hold the handle 7 and arm 98 in the position shown in full lines in Figs. 7 and 8.

As shown in Fig. 8, the pin 110 is threaded and carries a nut 112 on one side of the link 109, which coöperates with a washer 113 on the other side pressed by a spring 114, so as to create frictional engagement between said nut and said link 109. The pin 110 passes loosely through the slot in the link 108. It will thus be seen that the link 109 and its attached insulating-arm 101 always tends to move with the pin 110 in whichever direction impelled, while at the same time lost motion is permitted whenever movement of the arm 101 is prevented. On the other hand, the link 108 and attached arm 100 are not actuated at all until the arm 98 and pin 110 have been moved far enough to bring said pin into contact with the end of the slot in said link. An insulating-support 115 within the cover 8 carries a conducting-terminal 116, preferably of carbon. This terminal stands in the path of movement of contact-pieces 104 and 105 and preferably carries a mica sheet or other appropriate shield, as 117, (see Fig. 8ª,) which prevents arcs from crossing from 104 to 105.

It is clear from the above description that as the handle 7 is moved toward the dotted-line position in Fig. 7 the frictional engagement with the link 109 will draw the contact-piece 105 against the terminal 116, as shown in dotted lines in Fig. 7. Further movement of the handle 7 will simply serve to draw the arm 101 well forward and apply the tension of the spring 103 in producing good contact at 116. I prefer to proportion my device so as to permit a considerable movement of the handle beyond the position making the contact described before operation of the second arm 100 commences. This will give the range of movement desirable on electric cars, where otherwise jolting might make contact uncertain. The handle 7 being pushed far enough to the left in Fig. 7, the pin 110 will coöperate with the loose link 108 to draw the arm 100 forward, and thus establish contact between 104 and 116. This should occur shortly before the handle 7 strikes the buffer-stop 118. Thus as the handle 7 is pushed forward the contact-pieces 105 and 104 are successively impelled. On releasing the handle 7, however, the spring 111 draws it back against the buffer-stop 119, and the two arms 100 and 101 return simultaneously to open-circuit position, the spring 106 actuating the one and the other being impelled by the frictional engagement with the pin 110. Thus circuit is broken at 116 with both terminals 104 and 105 at once. While I prefer to place the manipulator thus described or its equivalent on the casing of the actuator mechanism, as above described, it is obvious that since its relation to said actuating mechanism is purely electrical it may be situated in any desired special relation thereto. It is also not essential to employ a separate manipulator for each actuating mechanism in a train, since the electric connection hereinafter described enables one manipulator to govern a number of actuating mechanisms. I have therefore shown in Fig. 12 one diagrammatic development of my manipulator in electric connection with the circuits of two similar controller-actuators. It will of course be understood that the electric connections shown in Fig. 12 for two actuating mechanisms may be extended to apply to any desired number without departing from my present invention.

It is within the scope of my present invention to employ current from any desired source; but for railway-work I prefer to use the arrangement shown in Fig. 12, wherein the current is taken directly from the line and wherein one pole of the supply-circuit for each controller-actuator is connected to the trolley 120, while the return-wire is connected to the terminal 116 of the manipulator or manipulators.

The operative electric connections used in the embodiment of my invention herein described is as follows: From the trolley 120 a wire leads directly to the terminal 65, carried by lever 51 and impelled by the push-rod 69. This terminal 65, as shown in Fig. 2, is adapted to make contact with a spring-terminal 64, attached to the framework. This latter terminal is connected electrically to one terminal of each of the electromagnets 59 and 66. It is obvious that the connections of terminals 64 and 65 may be interchanged without altering the results. The second terminal of the electromagnet 59 is connected to one side of the driving-motor 45, and the second terminal of the magnet 66 is connected to the insulated spring-arm 75 and button 74. The spring-arm 75 is also electrically connected to the spring-arm 103 and button 105 in the manipulator. The pivoted spring-arms 102 and 103 are shown in Fig. 12 as pivoted on separate centers instead of on the common pin 99. This is in order to render the diagram of circuits clear. For the same reason the terminal 116 is distorted in shape to indicate normal equality of distance from the two buttons 104 105. The button 73, adapted to coöperate with 74, is electrically connected to the contact-button 81. (See Figs. 4 and 12.) The intermediate button 80 of the automatic circuit-breaker is connected to the spring-arm 102 and button 104 of the manipulator. The third button 88 on lever 86 is connected to the free terminal of the driving-motor.

It is desirable to use my apparatus directly in circuit with the line without interposition of dead resistances, which consume energy and waste it as heat. At the same time where currents having a range of from four hundred to eight hundred volts are used, as in many cases of electric-railway practice, most small motors are quite unsuitable for operation of my apparatus.

I have found that by using a motor constructed as shown in Figs. 1 and 5, having a compound winding, as shown at 121 122 in Fig. 12, and using a high-resistance armature my automatic handle can be operated on the well-known main controllers now used in street-railway practice under a voltage varying even more than as above stated without making the motor larger than as proportionately shown in said Figs. 1 and 5 and without appreciable sparking at the commutator or undue heating of the coils. I have therefore shown a compound-wound motor in my diagrams, the series winding being at 121 and the shunt winding at 122. It is to be understood, however, that my invention is sufficiently broad in scope to cover the use of other forms of motor in this connection.

It will be understood that the circuit connections shown in Fig. 12 and above described are such as are appropriate where it is desired to enable the motorman to stop the main controller or power-regulator in only two positions; but modifications thereof securing stoppage at will in any reasonable number of positions desired will readily occur to those skilled in the art and come within the scope of my present invention. At the same time the specific form shown possesses certain decided advantages for use in electric-railway practice.

Firstly, it requires only two train-wires, (shown in Fig. 12 at 123 and 124,) which connect the controller-actuators in multiple throughout a train. Ordinary incandescent-lamp wires will in most cases be sufficient for this purpose.

Secondly, where controllers are used which cut out resistances successively to simple series connection of main motors and then cut them in and out again to produce simple multiple-arc connection my two-point actuator enables the motorman to bring the controller either to simple multiple arc for full speed or to simple series connection for half-speed, while making it impossible for him to let the controller stand on any point which includes resistance in the circuit. The advantage of this in preventing continued waste of energy in dead resistances is obvious.

Where slow speed is desired, a process of "drifting" is resorted to in practice. The motorman simply starts the motors up until the speed desired is attained and then shuts off the current entirely, relying on inertia of the car. This is a process frequently resorted to with the old crank-handle and is accomplished by my mechanism without any danger to the main controller through mechanical shocks.

My proposed mechanical and electrical construction having been thus described in its application to one embodiment of my invention, I shall now proceed to describe the operation of said embodiment in practice, assuming its use upon the end of the well-known controller-box for electric cars. (Shown in Figs. 9 and 10.)

As shown in the drawings, the main motors are supposed to be at rest, the indicator 19 being held back near the stop 21 by spring 20, as shown in Fig. 10, and the manipulator-handle 7 being held by its spring 111 against the stop 119, as also shown in Fig. 10. Supposing it is desired to run the main motors at the intermediate speed, preferably in simple series without resistances in circuit, for this purpose the handle 7 is brought to an intermediate position, such as that shown in dotted lines in Fig. 7, thus bringing the carbon terminal or button 105 into contact with the common terminal 116. Referring to Fig. 12, it will now be seen that circuit is established as follows: from trolley 120 through buttons 65 and 64, through magnet-coils 66, and thence to arm 103, button 105, terminal 116, and out to line. This current excites magnet 66, depressing armature 67 and bringing together buttons 73 and 74, thus acting as a relay. At the same time, said armature 67, through the push-rod 69 exerts an pressure, by means of the abutment 70, upon the brake-lever 51. When contact is made at 73 74 a branch circuit is established as follows: from trolley 120 through buttons 65 and 64 to magnet-coils 59, thence to motor 45 and through buttons 88, 80, and 81 of the automatic circuit-breaker, joining the original circuit at 73, 74, and 75 to go to line through terminal 116. The effect of this second circuit is to energize magnet 59 and press its armature against one of the extensions, as 28, of the brake-strap. At the same time the motor 45 will start up. It will thus be seen that the brake 27 is applied firmly by the joint effort of the magnets 66 and 59, the tightening-lever 22 having already provided an assisting force for this purpose. It may be stated in this connection that the magnet 59 is not essential to my preferred device, although desirable, inasmuch as, being always in series with the motor 45, it tends to relieve it from too great rush of current on the start, while at the same time its resistance is not a dead one, since it assists the magnet 66 in putting on the brake, and thus lessens the amount of current constantly flowing therein while the main motors are active. The motor 45 having started up and the brake being firmly set, the transmitting-train will impart movement to the shaft 16 in the direction of the arrow in Fig. 4, and by means of the socket 17 this will be communicated to the main controller and the car will start.

It will be seen that my device has the advantage of applying the current to the main motors at a speed of increase which is regulated once for all and is beyond the control of the motorman. A completely green hand can therefore start a car with my automatic handle without danger of jerking or throwing of passengers. As the shaft 16 revolves the cam 37 38 turns with it and acts by friction to drag the retarding-arm 36 in the direction of the arrow in Fig. 4, finally bringing the piston 40 to the outer end of its stroke within the dash-pot 41, when further motion will be prevented and idle friction will occur at the cam 37. When this cam reaches such a position that the wiper 94 drops behind the shoulder 91, the spring 89 will pull lever 86 to the left in Fig. 4, and contact will be broken between buttons 81 and 80, as heretofore explained. Reference to Fig. 12 will show that this break interrupts the branch circuit through the motor 45, and the shaft will stop moving. Proper location of the shoulder 91 on cam 38 will therefore cause the main controller to stop at any point desired. If now it is desired to proceed to full speed, the motorman simply pushes handle 7 far enough to the right in Fig. 10 to bring the second button 104 against the common terminal 116. This reestablishes circuit through the motor 45, the current now finding its way to the line directly through buttons 88, 80, and 104. The motor continues in motion until the second shoulder 92 permits spring 89 to break the circuit finally at 80 and 88. Of course if full speed were determined upon in the first place the motorman need only push the handle 7 all the way over to the stop 118 at first and the controller would move to full speed without stopping on the way. It will be seen that as long as current is to be maintained through the main motors the original circuit through the magnet 66 is not interrupted. This is necessary in order that the retaining function of this magnet may be continually exerted through the toggle action of the push-rod 69 in maintaining the pressure of the brake-strap 27 on the brake-wheel. As long as this pressure exists the returning-spring 20 cannot act to move the shaft back to normal. If, however, for any cause current fail even momentarily in magnet 66, the brake will spring open and the wedging-gears 33 being freed the spring 20 will throw the shaft 16 to the position shown in the drawings, and with it the main controller will return to normal, excluding all current from the car-motors. This action will take place when the motorman allows his handle 7 to move backward under the influence of its spring, since this will cause a simultaneous opening of circuit at both buttons 104 and 105, as heretofore stated. Thus to stop the car the motorman has only to release his handle, and he is then free to use both hands for his main brake. So, too, if the trolley jump or a switch is opened in the power-house one or all the controllers at the line will at once return to normal, due to failure of current in the magnet 66. Thus when the current is again transmitted, if the main motors are moving slowly or are stopped, there is no danger of a sudden rush of current burning them out, since even if the handle 7 has been persistently held all the way over to 118 by the motorman the controller will simply start up from normal again on reestablishment of line-current. Any accident to the motorman, whereby he is incapacitated, is also provided for, since as soon as he releases the handle 7 the controller returns to normal. It will be seen from Fig. 4 that however strong the main spring 20, which returns the controller to normal, my device prevents injurious shocks both to the main controller and to the carbon buttons 81, 80, and 88. The gradual and smooth return of the buttons by means of the cam 37 has already been described. Shock to the main controller is avoided by cushioning against air in the dash-pot 41 through abutment 43 and arm 36. In order that the elasticity of the air may not cause any rebounding and produce injurious arcing within the main controller and also to assist in obviating shock on return to normal, the function of the tightening-lever 22 is important. When the shaft turns backward, this lever, coming in contact with the spring 63, tips the lever 51 and partly applies the brake 27. Thus the dash-pot is aided in bringing the shaft to rest, and return or rebound due to the air cushion is prevented. Owing to this action of the lever 22, the indicator 19 will not generally rest against the stop provided for it, but will be held somewhere near said stop by the action of the strap-brake. As before observed, the quick return to normal takes place immediately on rupture of contact between the common terminal 116 and the button 104 or 105, or both. This rupture is accomplished by a relatively slight movement of the handle 7. It therefore becomes desirable that when this return to normal commences it should be completed and the cushioning effect be employed before the motor 45 is again brought into play to restore the controller to operative position. It is to insure this complete action, and thus prevent injurious mechanical shock due to catching the mechanism on its return by restoring contact at the manipulator or otherwise, that I have provided the circuit-breaker 64 65, in series both with magnet 66 and magnet 59. The circuit is never broken at 64 65 save when the brake-strap is fully released and magnet 66 is deënergized. This occurs during every return of my advice to normal owing to failure of current in magnet 66. It will thus be seen that once the break is produced between 64 and 65 it will not be restored until the mainspring has brought the tightening-lever 21 against the leaf-spring 63, thus tipping the break-lever 51 to bring 64 and 65 together. Consequently no current can reach the motor 45 or either brake-applying magnet until said tightening-arm has reached spring 63 and the return to normal is completed.

Many of the details of the device as herein shown and described may be made by those skilled in the art without departing from the spirit and scope of my present invention, and it is to be understood that I am not limited to said details save as explicitly set forth by the following claims.

What I claim is—

1. In a device for actuating a main power-regulator, automatic means for returning said regulator to normal, a brake for said actuating device, and means impelled by said returning means for applying said brake on return to normal.

2. In a device for actuating a main power-regulator, a main operating-shaft, automatic means for returning the same to normal, a brake adapted to be applied to said shaft and a tightening-lever on said shaft adapted to apply said brake on return to normal.

3. In a device for actuating a main power-regulator, a main operating-shaft, automatic means for returning the same to normal, a brake-wheel on the shaft, a strap-brake thereon, a pivoted lever and toggle-piece for applying said brake, and a tightening-lever moved by said main operating-shaft and adapted on return to normal to press said pivoted lever to apply said brake.

4. In a device for actuating a main power-regulator, automatic means for returning said regulator to normal, a brake, a pivoted lever for applying said brake, a spring-abutment thereon, and a portion of the movable device adapted to come in contact with said abutment to store power therein for applying said brake.

5. In a device for actuating a main power-regulator, automatic means for returning said regulator to normal, an air-cushion device for moderating said return, a brake for preventing rebound of said device on said air-cushion, and means actuated by the returning mechanism itself to apply said brake.

6. In a device for actuating a main power-regulator, automatic means for returning said regulator to normal, a piston and dash-pot for easing said return, and means having frictional engagement with said mechanism when operating to move away from normal, said means acting to bring the piston into operative position relative to said dash-pot.

7. In a device of the class described, two gears, one being operatively connected with a main power-regulator, and a brake-wheel and brake operatively connected to the other gear; in combination with means for producing relative movement between said gears, and means for applying or releasing said brake at will.

8. In a device of the class described, a main operating-shaft, a gear fast thereto, a second gear loosely sleeved thereon, and a brake-wheel moving with said second gear; in combination with means for producing relative movement of said gears and a brake adapted to coöperate with said brake-wheel.

9. In a device of the class described, a main operating-shaft, a gear fast thereto, a second gear loosely sleeved thereon, and a brake-wheel moving with said second gear; in combination with means for producing relative movement of said gears, a brake adapted to coöperate with said brake-wheel, a spring or its equivalent for returning said shaft to normal, means actuated by return movement of said shaft to apply said brake, and electromagnetic means for retaining said brake when thus applied.

10. In a device of the class described, a main operating-shaft, a driven gear fast thereon, a brake-gear loose thereon, said gears having differing numbers of teeth, a driving-gear also loose on said shaft, wedging-gears carried by said driving-gear and meshing with said driven gear and brake-gear, means for actuating said driving-gear and means for fixing said brake-gear.

11. In a device of the class described, a main operating-shaft, power-transmitting means centered thereon, electric means for driving said transmitting means, circuit-breakers controlling said electric means and devices controlled by movement of said main driving-shaft to operate said circuit-breakers.

12. In a device of the class described, a main operating-shaft, a spring wound around said shaft for returning the same to normal, a cam upon the shaft, an electric motor for driving said shaft, a circuit-breaker for controlling said motor and a lever bearing against said cam for governing said circuit-breaker.

13. In a device of the class described, a main operating-shaft, a spring wound around said shaft for returning the same to normal, a cam upon the shaft cut with a number of steps, an electric motor for driving said shaft, a multiple circuit-breaker for controlling said motor and a lever bearing against said cam and adapted to produce successive breaks at said multiple circuit-breaker, as each step in said cam is reached on movement of said main shaft.

14. As a means for automatically controlling electric circuits a swinging lever, two cam-layers adapted to revolve together in both directions, and two wipers on said lever, one adapted to bear upon one of said cam-layers when it moves in one direction and the other adapted to bear on the other cam-layer when moving in the opposite direction.

15. As a means for automatically controlling electric circuits a swinging lever, two cam-layers adapted to revolve together in both directions, one layer presenting an unbroken spiral edge, and the other having shoulders on its edge, a fixed wiper on said lever adapted to bear operatively upon said spiral edge while moving in one direction and a pivoted wiper on said lever adapted to bear operatively against said shouldered edge when moving in one direction and to bend under the cams when said fixed wiper is operative.

16. In a device of the class described, adapted to be stopped in a number of positions, an electric driving means, a spring-arm and contact-button corresponding to each position of rest, of said driving means and in circuit therewith, a swinging lever and contact-button, means for actuating said lever to push all said buttons together against the resilient tendency of said spring-arms, and an abutment in the path of each spring-arm preventing the same from following retractile movement of said swinging lever so as to cause successive ruptures of circuit at the spring-arms.

17. In a circuit-breaking switch, a series of spring-arms having a resilient tendency in one direction, terminals on said arms adapted to come in contact when pressed in the opposite direction to said tendency and an abutment in the path of each spring-arm, whereby as said buttons move under the influence of said tendency they are one by one removed from contact with each other.

18. In a device of the class described, an upper and lower framing, a substantially central driving-shaft pivoted between said frames, a speed-reducing transmission system centered on said shaft for moving the same and an electric driving-motor for actuating said transmission system.

19. In a device of the class described, an upper and lower framing, a substantially central driving-shaft pivoted between said frames, a speed-reducing transmission system centered on said shaft for moving the same, an electric motor for actuating said transmission system, two sets of circuit-breakers for controlling said motor and means moving with said shaft for successively operating said circuit-breakers.

20. In a device of the class described, an upper and lower framing, a substantially central driving-shaft pivoted between said frames, a transmission system centered on said shaft, an electric motor for actuating said transmission system, a spiral spring attached to the top framing and to said driving-shaft tending to return the latter to normal.

21. In combination with a main electric-car controller complete in itself, a self-contained automatic means for actuating and controlling the same adapted to fit upon the top or end thereof.

22. In combination with a standard electric-car controller, a self-contained automatic means for actuating the same containing an electric driving-motor and adapted to fit upon the top or end of said controller, and circuits for connecting the main line directly to said motor without dead resistances.

23. In combination with a main electric controller complete in itself, a self-contained automatic handle for actuating the same adapted to replace the ordinary crank-handle and to be taken off or put onto said controller at will.

24. In combination with a main electric controller, complete in itself, a self-contained automatic handle having a main driving-shaft forming a virtual prolongation of the main controller-axis and extending through the automatic handle, and an indicator on the top of said driving-shaft.

25. In a self-contained automatic handle, a main frame and main operating-shaft terminating beneath said frame in means adapted to connect with the main axis of a controller-box and shaped above said frame so as to receive the socket on the ordinary crank-handle used for manual operation of said main axis.

26. In combination with a main electric controller complete in itself, a self-contained removable automatic handle for actuating the same and adapted to fit on the top or end of said controller, said handle having a main driving-shaft provided with a socket fitting over the end of the main controller-axis, and the framework of said handle having means coöperating with the usual stop on said main controller, to hold said framework in a fixed position.

27. In combination with a main electric controller complete in itself, a self-contained automatic electric means for actuating the same fitting on the top or end thereof, a manipulator-switch within the casing of said means and a manipulator-handle pivoted on said casing.

28. In combination with a main electric controller complete in itself, a self-contained automatic electric means for actuating the same fitting on the top or end thereof, a manipulator-switch within the casing, a manipulator-handle pivoted on said casing and a spring or equivalent tending to force said handle always toward one extreme position.

29. In an automatic actuating device for power-regulators, a casing, a pivoted handle outside of said casing, an operating-lever turning therewith within said casing, a switch operated by said lever, stops for limiting the movement of said handle and lever, and a retractile spring acting to normally hold said handle and lever against one of said stops.

30. In combination with a series of main electric controllers for electric cars, each complete in itself, a self-contained automatic electric means fitting on the top or end of each of said main controllers for actuating the same and a manipulator-switch connected electrically with said several actuating means whereby they may all be controlled from a single point.

31. In a device of the class described, an auxiliary electric motor, an energizing-circuit therefor, power-transmitting mechanism and connecting means for establishing operative relation between said motor and transmitting mechanism; in combination with means for automatically closing a break in said energizing-circuit during operation of said connecting means and opening said break when said connecting means are idle.

32. In an actuator for power-regulators, an auxiliary driving-motor, a power-transmitter for actuating the main power-regulator, means for operatively connecting the auxiliary motor to said power-transmitter, an electromagnet and a second means operated by said magnet for maintaining said operative connection when made.

33. In an actuator for power-regulators, an auxiliary electric driving-motor, a power-transmitter for actuating the main power-regulator, means for operatively connecting the auxiliary motor to said power-transmitter, an electromagnet for closing circuit through said motor, and a second means operated by said magnet for maintaining said operative connection when made.

34. In an automatic actuator for power-regulators, a spring or equivalent means tending to return the mechanism to normal, an auxiliary motor for driving the actuator, means for starting said motor, means for operatively connecting the same with the power-regulator, and means for simultaneously stopping said motor and holding the mechanism against the power of said spring or equivalent.

35. In an automatic actuator for power-regulators, an auxiliary electric driving-motor, a power-transmitter for actuating the main power-regulator, means for operatively connecting the auxiliary motor to said power-transmitter, an electromagnet in series with said driving-motor, a second electromagnet for closing said series circuit, and means whereby said magnets tend together to operate said connecting means.

36. In a device of the class described, an auxiliary driving-motor, a power-transmitter for actuating a main power-regulator, a strap-brake for operatively connecting said motor and transmitter, a lever pivoted on said strap-brake, a toggle connecting said lever and strap-brake to tighten the latter, an electromagnet, an armature therefor and a push-bar connecting said armature and said pivoted lever.

37. In a device of the class described, an auxiliary electric driving-motor, a power-transmitter for actuating a main power-regulator, a strap-brake for operatively connecting said motor and transmitter, a lever pivoted on said strap-brake, a toggle connecting said lever and strap-brake to tighten the latter, an electromagnet operating as a relay to close the circuit of said motor, an armature therefor and a push-bar connecting said armature and said pivoted lever.

38. In a device of the class described, an auxiliary electric driving-motor, a power-transmitter for actuating a main power-regulator, a strap-brake for operatively connecting said motor and transmitter, a lever pivoted on said strap-brake, a toggle connecting said lever and strap-brake to tighten the latter, an electromagnet operating as a relay to close the circuit of said motor, an armature therefor, a push-bar connecting said armature and said pivoted lever, and a circuit-breaker operated by said pivoted lever to close a circuit to the driving-motor when the brake is applied and to open it when the brake is released.

39. In a device of the class described, an auxiliary electric driving-motor, a power-transmitter for actuating a main power-regulator, electrically-controlled means for insuring operative connection between said motor and transmitter, means for returning the device to normal when said operative connection is interrupted, and a circuit-making switch in circuit with said motor and said connecting means adapted to open during said return to normal and to be closed only on completion of said return to normal.

40. In a device of the class described, an auxiliary electric driving-motor, means for producing operative connection between said motor and a power-regulator and a magnet in series with said motor having an armature tending, on energizing of said magnet, to operate said connecting means.

41. In an electric switch, a stationary contact-terminal, two swinging arms bearing contact-pieces adapted to be brought in contact with said terminal, a slotted link pivotally attached to each swinging arm and a pivoted operating-lever having a pin passing through the slots in both of said links.

42. In an electric switch, a stationary contact-terminal, two swinging arms bearing each a leaf-spring carrying a movable contact-terminal adapted to be brought in contact with said stationary terminal, a slotted link pivotally attached to each swinging arm and a pivoted operating-lever having a pin passing through the slots in both of said links.

43. In an electric switch, a common stationary electric terminal, two movable terminals, automatic means adapted to move in one direction to cause successive contact of said movable terminals with said stationary terminal and in the opposite direction to produce simultaneous interruption of such contacts.

44. In an electric switch, a stationary electric terminal, two swinging arms carrying movable electric terminals adapted to move against said stationary terminal, a slotted link pivoted to each swinging arm and an operating-lever having a pin passing loosely through one of said links and with frictional engagement through the other.

45. In an electric switch, a stationary electric terminal, two swinging arms carrying movable electric terminals adapted to move against said stationary terminal, a retractile spring for one of said swinging arms, a slotted link pivoted on each of said swinging arms, an operating-lever having a pin passing loosely through the link pivoted on the swinging arm having the retractile spring and passing with frictional engagement through the other link, and a retractile spring for said operating-lever.

46. In combination with a series of main electric controllers for electric cars in a train, a trolley for each car, an automatic electric means for actuating each main controller, a manipulator common to said several automatic actuators, a connection from the driving-motor of each actuator to the trolley on its own car, a connection from the other side of each actuator-motor to the common manipulator, and a connection from said manipulator to ground.

47. In combination with a series of main electric controllers for electric cars in a train, a trolley for each car, an automatic electric means for actuating each main controller, manipulators on a number of said cars common to said several automatic actuators, a connection from the driving-motor of each actuator to the trolley on its own car, a connection from the other side of each actuator-motor to all the common manipulators, and connections from said manipulators to ground.

48. A number of controllers for electric motors, one automatic electric actuator for each controller adapted to be stopped in a number of positions, a manipulator for governing all of said actuators and a group of conductors connecting said manipulator and actuators, said group containing as many separate conductors as there are stopping positions for each actuator and no more.

49. A number of electric automatic actuators for main motor-controllers, each comprising a motor for driving said controller and a relay for establishing circuit through said driving-motor; in combination with a common manipulator for said actuators a conductor connecting said manipulator with said relays and one or more conductors for establishing one or more branches around said relays through said motors and said manipulator.

EDWIN R. GILL.

Witnesses:
M. E. STODDART,
H. S. MACKAYE.